United States Patent [19]
Klassen

[11] Patent Number: 5,333,249
[45] Date of Patent: Jul. 26, 1994

[54] METHOD FOR PHASE ALIGNED NTH BITTING OF GRAPHICS APPLICATIONS

[75] Inventor: R. Victor Klassen, Webster, N.Y.

[73] Assignee: Xerox Corporation, Stamford, Conn.

[21] Appl. No.: 844,096

[22] Filed: Mar. 2, 1992

[51] Int. Cl.5 .............................................. G06F 15/62
[52] U.S. Cl. ..................... 395/143; 395/132; 395/141; 395/142; 345/136; 345/138
[58] Field of Search .................... 395/125-132, 395/141-143, 162, 163; 345/138, 136, 137

[56] References Cited

U.S. PATENT DOCUMENTS

| | | | |
|---|---|---|---|
| 4,808,984 | 2/1989 | Trueblood et al. | 340/723 |
| 4,808,988 | 2/1989 | Burke et al. | 395/143 X |
| 4,873,515 | 10/1989 | Dickson et al. | 340/728 |
| 4,907,282 | 3/1990 | Daly et al. | 382/9 |
| 4,918,626 | 4/1990 | Watkins et al. | 364/522 |

FOREIGN PATENT DOCUMENTS

WO9114995 10/1991 PCT Int'l Appl. .......... G06F 15/62

OTHER PUBLICATIONS

Foley et al., Computer Graphics Principles & Practice pp. 72-91 (1990).
Computer Graphics, "A New Simple and Efficient Antialiasing with Subpixel Masks", vol. 25, No. 4, Jul. 1991, pp. 133-141.

Primary Examiner—Mark K. Zimmerman
Assistant Examiner—Almis Jankus
Attorney, Agent, or Firm—Gary B. Cohen

[57] ABSTRACT

A method is provided for at least partially superposing an edge of a first object with the edge of a second object in a system for displaying at least the first and second objects against a background. The objects and the background are defined by a plurality of pixels and each pixel possesses a selected one of at least a first output state and a second output state. The method includes the steps of: setting a first set of dispersed pixels disposed along the edge of the first object to the second output state; setting a second set of dispersed pixels disposed along the edge of the second graphic object to the second output state; and superposing the edge of the first object with the edge of the second object so that the first set of pixels is intermeshed with the second set of pixels to form a partial pixel boundary between the first object and the second boundary.

21 Claims, 9 Drawing Sheets

FIG. 8
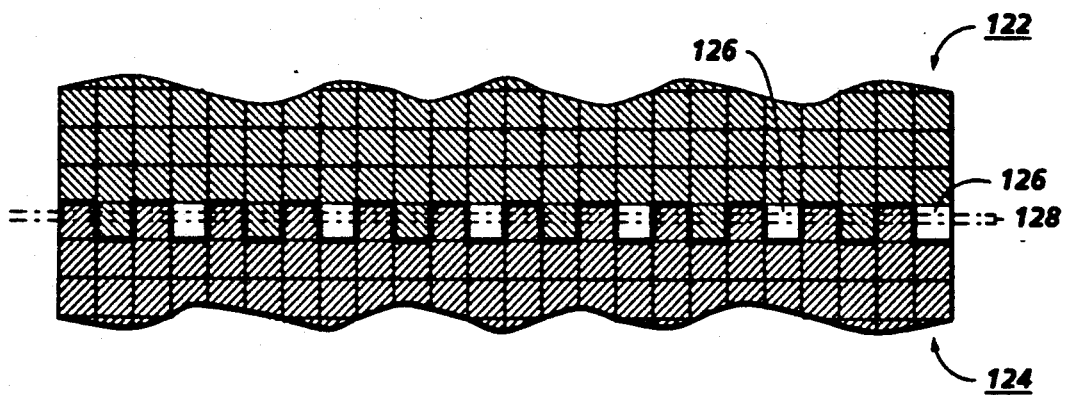
FIG. 9A
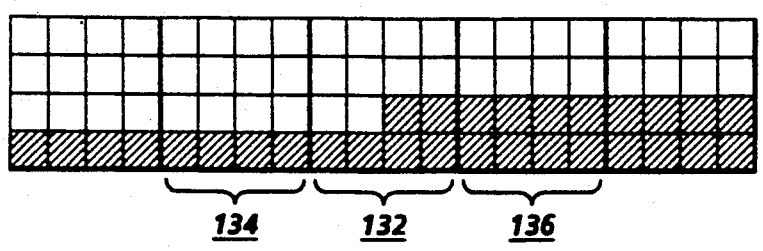
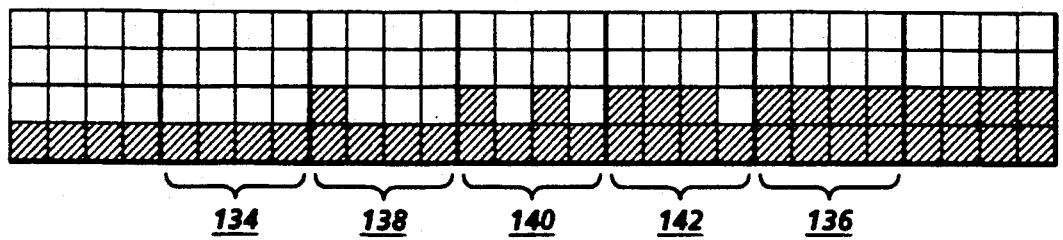
FIG. 9B

METHOD FOR PHASE ALIGNED NTH BITTING OF GRAPHICS APPLICATIONS

BACKGROUND OF THE INVENTION

1. Field of the Invention

The present invention relates generally to a method for manipulating edges in an image and more specifically for creating and using nth bitted patterns to facilitate image processing.

2. Description of the Prior Art

One approach to making raster characters look better is a technique referred to as "nth-bitting." Nth bitting can be used to align an edge of a font or a graphic object to a partial-pixel boundary by turning on selected pixels disposed along the edge. For example, half-bitting, a technique for aligning edges to half-pixel boundaries by turning on alternate pixels along an edge, is currently used in the rasterization of characters. As illustrated in U.S. patent application Ser. No. 07/416,211, entitled "Rapid Halfbitting Stepper," filed Oct. 2, 1989, the relevant portions of which are incorporated herein by reference, half bitting is employed to increase the width of a line by one half of a pixel. In practice, nth-bitting techniques serve to increase the effective addressability of an output device, such as a high resolution graphics display unit or a printer, and can be performed with lines that are relatively close to either horizontal or vertical.

Picture degradation in raster scan displays caused by aliasing presents the image of "jaggy" or "staircase" appearance of lines and edges. The following patents are directed toward just a few of the antialiasing techniques which have been proposed.

U.S. Pat. No. 4,808,984 Patentee: Trueblood et al. Issued: Feb. 28, 1989

U.S. Pat. No. 4,873,515 Patentee: Dickson et al. Issued: Oct. 10, 1989

U.S. Pat. No. 4,907,282 Patentee: Daly et al. Issued: Mar. 6, 1990

U.S. Pat. No. 4,918,626 Patentee: Watkins et al. Issued: Apr. 17, 1990

U.S. Pat. No. 4,808,984 discloses a computer generated graphic display system of the type which generates image display data including data representing the intensity of each pixel of the display, a raster scan graphic display for displaying the image data, and antialiasing means. An improvement to the computer generated graphic display system comprises gamma correction means supplied with antialiased display data for correcting of nonlinearity in the relationship between the pixel intensity data and the actual intensity of the corresponding pixel of the raster scan display.

U.S. Pat. No. 4,873,515 discloses an invention based on the recognition that lines and edges in a computer-graphics raster display can be made to appear smoother by widening the line to incorporate several pixels and varying the intensity of the pixels in an averaging or filtering process. The filtering process has the effect of shading or leathering the line to accomplish an antialiasing improvement. In general, a pixel processing system is provided for reducing undesirable jagged effects by expanding the number of pixels involved in the presentation of a line.

U.S. Pat. No. 4,907,282 discloses a method and apparatus for creating and storing characters for display on a video screen. The shape of the graphic character is displayed at various degrees of resolution. The graphic character is stored as a bitmap or as coefficients of spline curves. These can be scaled up or down to give different character sizes. The coefficients can be converted to form pixelmaps which are rectangular arrays of pixels. The pixelmaps may have gray scale values.

U.S. Pat. No. 4,918,626 discloses a process or product for resolving priority between polygons contending for individual areas in a display, e.g. pixels or subpixels. Priority is resolved by defining the edge where the planes of the two polygons intersect, then by applying a simple test of sign values after transforming the edge to the space of the display screen and determining the slope of such an edge. Along with resolving priority between contending polygons, the system, as disclosed, filters the pixel data. Accordingly, the system facilitates production of relatively clean, sharp edges in a video graphics raster scan display.

The following reference discloses an algorithm for creating subpixel masks to perform antialiasing of edges automatically:

Schilling "A New Simple and Efficient Antialiasing with Subpixel Masks" Computer Graphics, Volume 25, Number 4, July 1991 pp. 133-141

The Schilling article discloses a method and an apparatus for selectively turning on subpixels of a pixel disposed along the edge of an object. This method serves to solve a problem in which individual subpixels of the pixel cannot be selectively turned on automatically. In the approach of the article, the exact portion covered by the edge of the object can be calculated, on a pixel-by-pixel basis, and a suitable number of subpixels turned on. For example, in an edge pixel divided into a $4 \times 4$ array of subpixels, if the edge only covers 2/16 of the pixel, a coverage of 2 subpixels, instead of 0 or 4 subpixels, can be obtained readily.

Under current technology nth bitting can be difficult and costly to perform. It would be desirable to provide an inexpensive and simple technique for readily nth bitting an edge of any font or graphic object. Moreover, while the approach of Schilling represents an improved approach in the area of antialiasing, it would still be desirable to provide an alternative approach that makes antialiasing as simple and inexpensive as possible.

SUMMARY OF THE INVENTION

In accordance with the present invention, a method is provided for constructing a first group of template scanlines for use on a first edge in an image and a second group of template scanlines for use on a second edge in the image. Each template scanline is divided into at least two equal portions of pixels with n pixels in each portion and each of the pixels possesses a selected one of at least a first output state and a second output state. The method comprises the steps of:

providing first and second template scanlines to the first group of template scanlines and third and fourth template scanlines to the second group of template scanlines;

setting a first selected number of pixels in the first template scanline to the second output state;

setting a first selected number of pixels in the third template scanline to the second output state, the pixels with the second output state in the first scanline being offset relative to the pixels with the second output state in the third scanline;

setting a second selected number of pixels in the second template scanline to the second output state; and setting a second selected number of pixels in the fourth template scanline to the second output state, the second selected number of pixels being different than the first selected number of pixels.

In another aspect of the invention, a method is provided for at least partially superposing an edge of a first object with the edge of a second object in a system for displaying at least the first and second objects against a background. The objects and the background are defined by a plurality of pixels and each pixel possesses a selected one of at least a first output state and a second output state. The method comprises the steps of:

setting a first set of dispersed pixels disposed along the edge of the first object to the second output state;

setting a second set of dispersed pixels disposed along the edge of the second graphic object to the second output state; and superposing the edge of the first object with the edge of the second object so that the first set of pixels is intermeshed with the second set of pixels to form a partial pixel boundary between the first object and the second boundary.

In yet another aspect of the invention, a method is provided for reducing aliasing along an edge of an object, the edge including first, second and third pixels being positioned substantially adjacent one another and along a common axis. The method comprises the steps of:

dividing each of the first, second and third pixels into respective first, second and third grids, each of the grids comprising a matrix of n×n subpixels, each subpixel possessing a selected one of at least a first output state and a second output state;

providing a template scanline of n subpixels, c of the n subpixels in the template scanline being set to the second output state;

setting d subpixels in the first and second grids to the second output state so that respective edges are formed by the d subpixels in the first and second grids;

setting e subpixels in the third grid to the second output state; and using the template scanline for setting c subpixels along the edge in the second grid to the second output state so that the second pixel serves as a transitional pixel between the first pixel and the third pixel to facilitate antialiasing.

These and other features of the invention will become apparent from the following description, the description being used to illustrate a preferred embodiment of the invention when read in conjunction with the accompanying drawings.

BRIEF DESCRIPTION OF THE DRAWINGS

FIG. 8 is a schematic, plan view of two objects with intermeshed fourth bitted edges in which the turned on pixels of the edges have been suitably offset and a visual gap has been formed;

FIG. 9A is a schematic, plan view of a common prior art arrangement in which two pixel spans are separated by an intermediary pixel;

FIG. 9B is a schematic, plan view of an arrangement in which two pixel spans are separated by intermediary pixels in accordance with the inventive method;

DESCRIPTION OF A PREFERRED EMBODIMENT OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

In the application of fonts and graphics, it may be desirable to form partial-pixel boundaries along edges of an object. A partial-pixel boundary can be formed by turning on selected pixels along an edge and varying the spatial frequency of the turned-on pixels to achieve a desired width. This process of varying spatial frequency, which is referred to as "nth-bitting," allows the boundary of an edge to be varied from either 0 pixel to $(n-1)/n$ pixel or from $1/n$ pixel to 1 pixel.

Figure 1A:
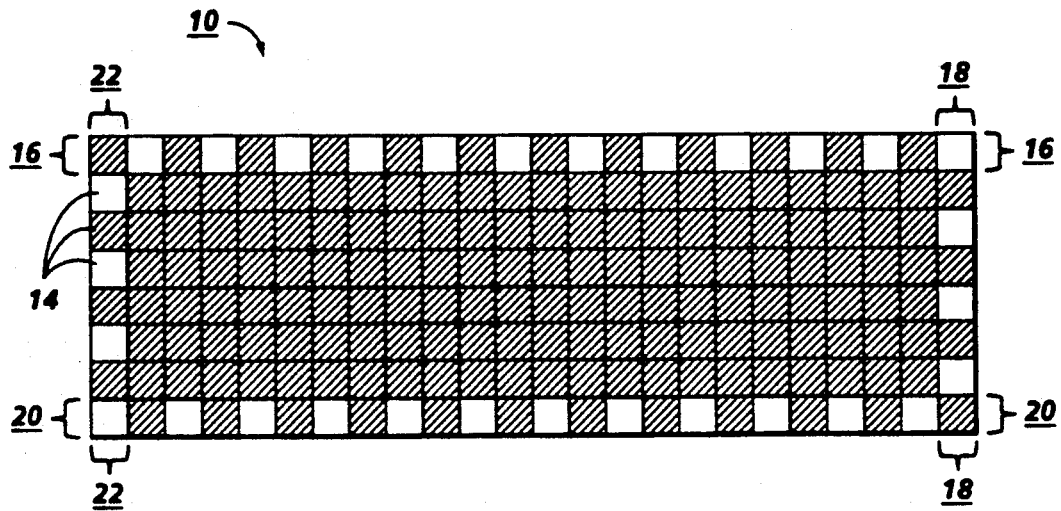
FIGS. 1A and 1B are respective schematic, plan views of font stems or graphic objects with nth bitted edges.
Figure 1B:
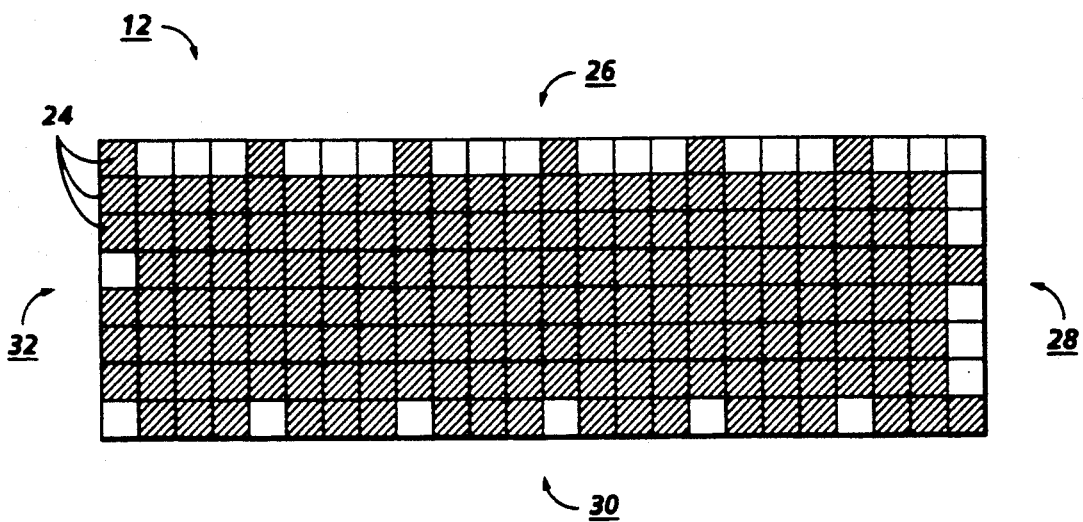

Referring to FIGS. 1A and 1B, examples of nth-bitting are illustrated with objects 10 and 12. It will be appreciated from the discussion below that the value of n is not limited to four, as shown in FIGS. 1A and 1B. The object 10 of FIG. 1A, which is composed of a plurality of pixels 14 possesses half-bitted edges 16, 18, 20 and 22. As will be explained in further detail below, the pixels along each edge are preferably configured to intermesh with an adjacent similarly configured object. When used in a display as a font or a graphic, the object 10 has a boundary about each edge appearing to be one-half pixel wide. The object 12 of FIG. 1B, which is composed of a plurality of pixels 24 possesses one quarter-bitted edges 26, 28 and three quarter-bitted edges 30, 32. As will be explained in further detail below, the pixels along each edge of object 12 are preferably configured to intermesh with an adjacent similarly configured object. When used in a display, such as a font or a graphic, the object 12 has boundaries appearing to be one-quarter pixel wide along edges 26,28 and three-quarter pixel wide along edges 30,32.

An edge pattern or template scanline is preferably used to automatically form partial pixel boundaries along edges of fonts or objects, such as objects 10 and 12. Edge patterns are developed for opposing edges of a font or an object so that, among other things, the edges can be intermeshed, as explained in further detail below. While edge patterns can be developed for any value of n, it has been found that quarter bitting, sixth bitting and eighth bitting patterns are particularly useful as references. In one embodiment of the present invention these bitting patterns are as follows:

| First Edge | Second (Opposing) Edge |
|---|---|
| Quarter Bitting | |
| 1/2: 10101010 . . . | 01010101 . . . |
| 1/4: 10001000 . . . | 00010001 . . . |
| 3/4: 11101110 . . . | 01110111 . . . |
| Sixth Bitting | |
| 1/2: 101010101010 . . . | 010101010101 . . . |
| 1/6: 100000100000 . . . | 000001000001 . . . |
| 1/3: 101000101000 . . . | 010100010100 . . . |
| 2/3: 101011101011 . . . | 010111010111 . . . |
| 5/6: 111011111011 . . . | 011111011111 . . . |
| Eighth Bitting | |
| 1/2: 1010101010101010 . . . | 0101010101010101 . . . |
| 1/8: 1000000010000000 . . . | 0001000000010000 . . . |
| 1/4: 1000100010001000 . . . | 0001000100010001 . . . |
| 3/8: 1010100010101000 . . . | 0001010100010101 . . . |
| 5/8: 1110101011101010 . . . | 0101011101010111 . . . |
| 3/4: 1110111011101110 . . . | 0111011101110111 . . . |
| 7/8: 1110111111101111 . . . | 0111111101111111 . . . |

The above edge patterns are formed in accordance with the following rules:
1) For patterns in which n is a multiple of 2, patterns are created in the order: ½, 1/n, 2/n, . . . ((n/2)−1)/n;
2) For any given value of c/n, the pattern used on the first edge should be offset as far as possible from the comparable pattern used on the second (opposing) edge without violating rule 4) set forth below;
3) For a given group of edge patterns with a one-half bitted pattern and patterns for values of j/n and m/n, where m/n<j/n<½, zeros in the patterns of j/n correspond with zeros in the patterns of m/n, and ones in the patterns of j/n and m/n correspond with one or more ones in the one-half bitted pattern; and
4) For patterns in which c/n>½, the corresponding pattern for the first edge is the complement of the pattern for the second edge having the value 1-(c/n) and the the corresponding pattern for the second edge is the complement of the first edge having the value 1-(c/n).

Figure 2:
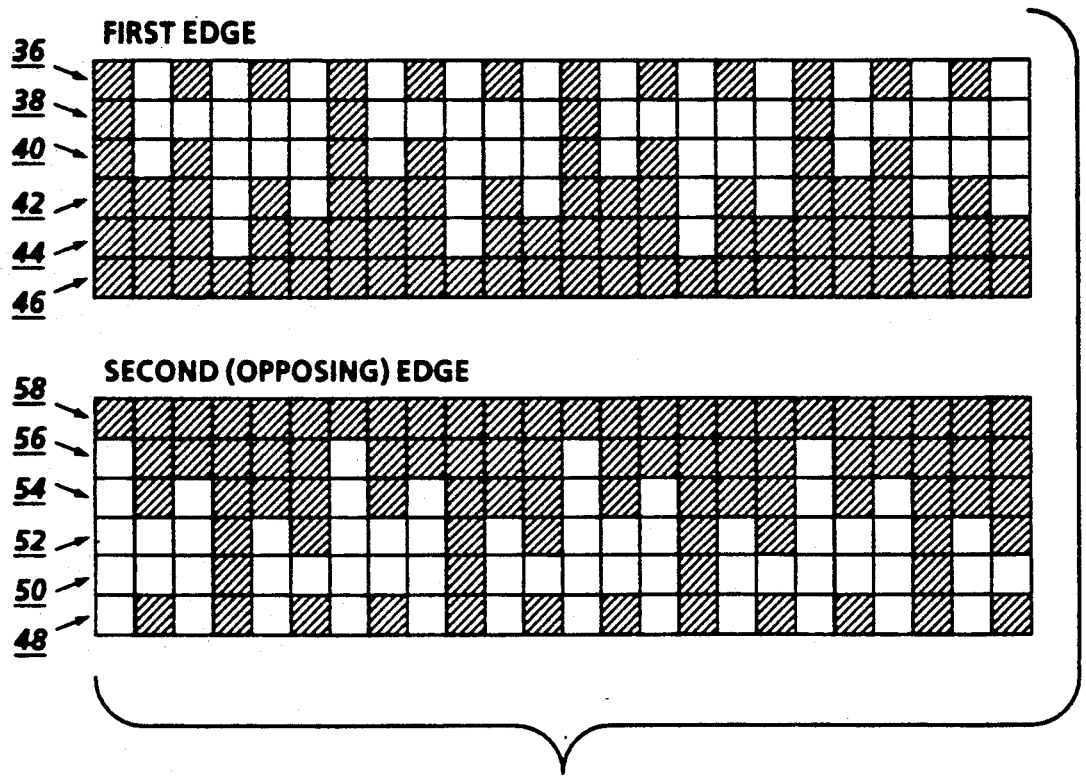
FIG. 2 is a schematic, plan view of template scanlines used to form sixth bitted edges on two opposing edges.

Referring to FIG. 2, the application of the above-stated rules can be more fully comprehended. The example of FIG. 2 illustrates how the pattern-generating technique is applied in sixth-bitting, but it will be appreciated by those skilled in the art that the technique is generic to any nth bitting case. In the case of sixth bitting, 12 template scanlines, namely scanlines 36,38,40,42,44,46,48,50,52,54,56,58, are provided. Scanlines 36,38,40,42,44,46 are used to form one edge, e.g. top edge, while scanlines 48,50,52,54,56,58 are used to form another, opposing edge, e.g. bottom edge. Each of scanlines 36,38,40,42,44,46,48,50,52,54,56,58 is preferably partitioned into six bit portions.

In accordance with rule 1), scanlines 36 and 48 are half-bitted, i.e. every other bit is turned on, and, in accordance with rule 2), the turned-on bits of scanline 48 are off-set as much as possible relative to scanline 36. Following rule 1), one sixth bitting is performed in scanlines 38,50 and one bit in every six bit portion is turned-on. In view of rule 3, the turned on bit of scanline 38 is positioned in either the first, third or fifth bit of each six bit portion. In the illustrated embodiment of FIG. 2, the first pixel in each six bit portion of scanline 38 is chosen arbitrarily as the pixel to be turned on. Per rules 2) and 3), the turned-on bit of scanline 50 should be positioned in the fourth bit of each six bit portion.

Following rule 1), two sixths bitting is performed in scanlines 40,52 and two bits in every six bits is turned-on. In view of rule 3, for each six bit portion of scanline 40,the turned on bits are positioned in the first bit and one of the third and fifth bits. In the illustrated embodiment of FIG. 2, the third pixel in each six bit portion of scanline 40 is chosen arbitrarily as the pixel to be turned on. Per rules 2) and 3), the turned-on bits of scanline 52 should be positioned in the fourth and sixth bits of each six bit portion. Since half bitting is achieved in scanlines 36,48, four sixths bitting is performed directly after two sixths bitting. Four sixths bitting is performed in accordance with rule 4). In particular, the four sixths pattern in scanline 42 is the complement of the two sixths pattern in scanline 52 and the four sixths pattern in scanline 54 is the complement of the two sixths pattern in scanline 40. The five sixths patterns of scanlines 44,56 are obtained by use of rule 4) in that scanline 44 is the complement of scanline 38 and scanline 56 is the complement of scanline 50. In one example, six sixths bitting patterns, rather than zero sixths bitting patterns, are developed in scanlines 46,58.

Now that the edge pattern development technique has been discussed, use of the edge patterns in constructing partial pixel boundaries can be better understood. In particular, the edge patterns can be stored in memory and applied to the edge of an object or polygon automatically. For example, in constructing object 10, the template scanline 48 can be used to form the bottom edge while the template scanline 36 can be used to form the top edge.

Figure 3A:
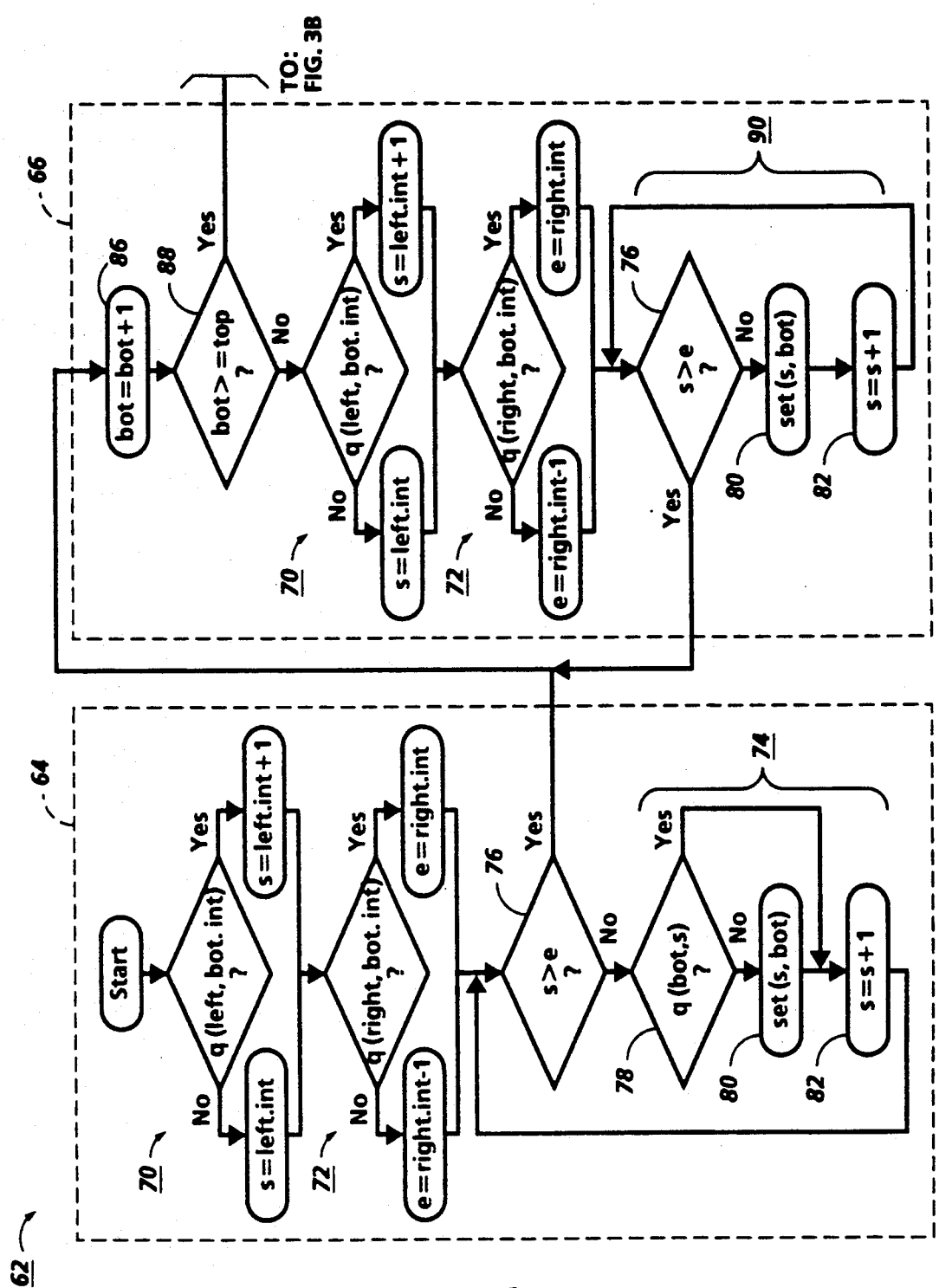
FIGS. 3A and 3B conjunctively represent a flow diagram of a process for drawing an object with nth bitted edges.
Figure 3B:
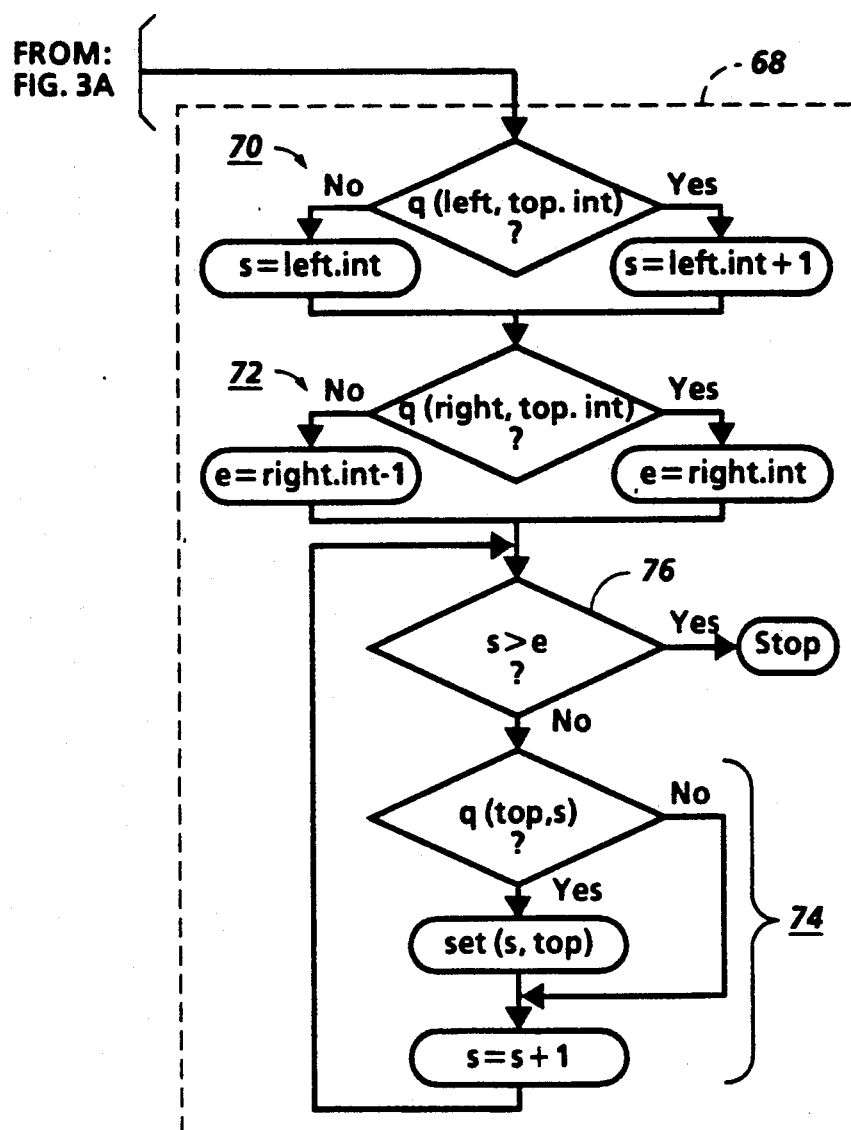

Referring to FIG. 3, a flow diagram for constructing objects or polygons, such as the object 10, is designated by the numeral 62. The exemplary flow diagram 62 is divided into three drawing routines 64, 66 and 68, and decisions about turning on pixels along an edge is made with a q predicate. The properties of a given predicate varies as a function of the particular type of nth bitting being performed.

Drawing routine 64, which allows for the drawing of the bottom edge of the object, comprises a beginning index setting subroutine 70, an end index setting routine 72 and a pixel setting subroutine 74. In subroutines 70 and 72 the predicate function is applied selectively to the right and left points of the bottom edge. In subroutine 74, a limit check is applied at decision block 76, an evaluation is performed at decision block 78 and a pixel is either set at block 80 or the subroutine is incremented at block 82. In one example, the setting of a pixel refers to setting a pixel at a particular gray value or color.

Drawing routine 66, which allows for the drawing of the body of the object, comprises an incrementing block 86, limit check 88 and the subroutines 70,72. Additionally, the drawing routine includes a pixel setting subroutine 90, the subroutine 90 having the limit check 76, the pixel setting block 80 and the incrementing block 82. As can be appreciated by those skilled in the art, the use of subroutines 70,72 permits nth bitting of the left and right edges of the object during the drawing of the object's body. Drawing routine 68 employs the same concept as drawing routine 64 to draw the top edge of the object. In the illustrated embodiment of flow diagram 62, the design is such that given the same coordinates for a pixel in a top edge, and a bottom edge, the opposite decisions will be made in deciding whether or not to turn on a pixel.

Figure 4:
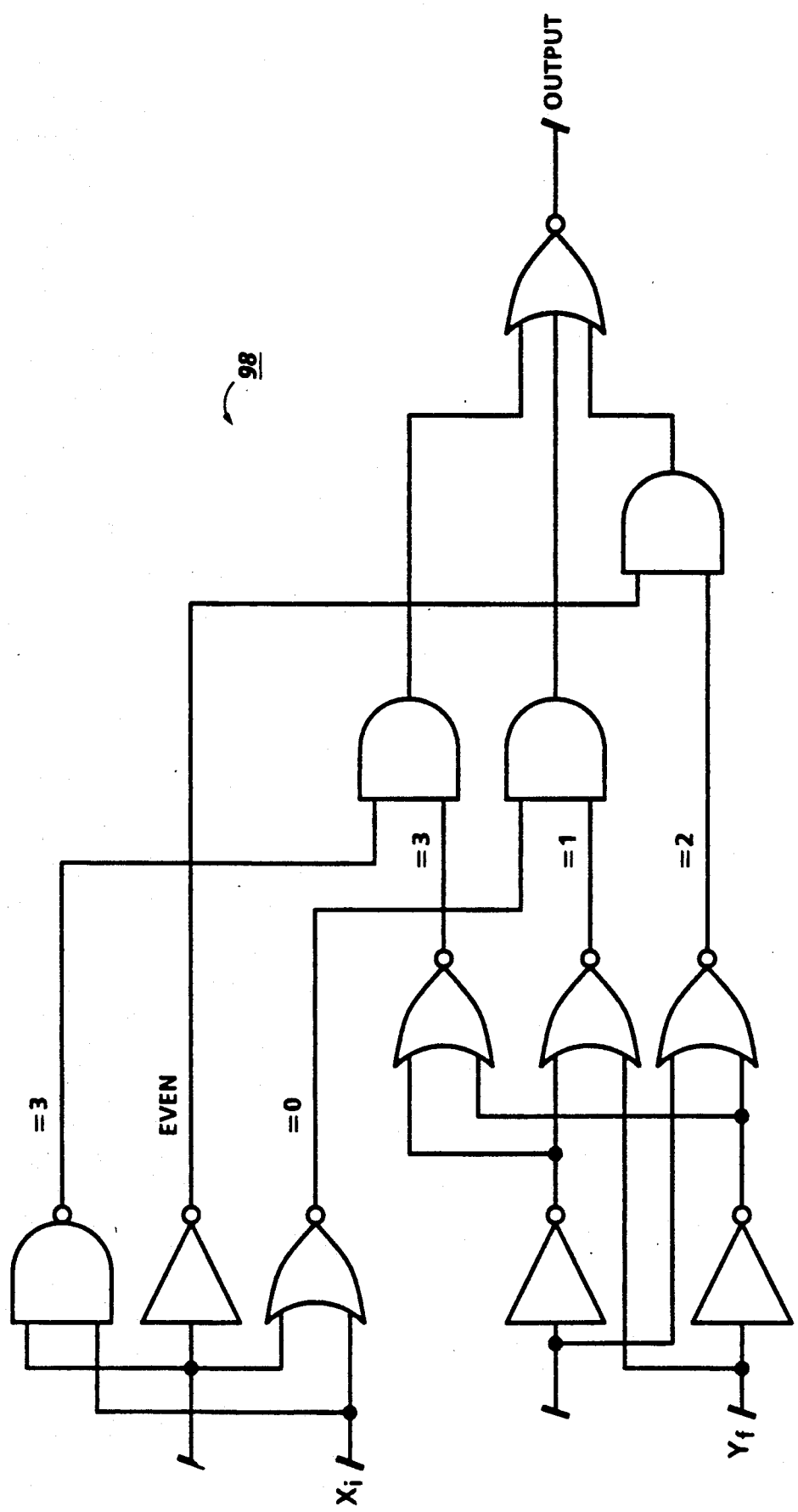
FIG. 4 is a schematic view of a logical implementation used to form quarter bitted edges.

Referring to FIG. 4, an implementation of the the q predicate for a quarter-hitting case is designated by the numeral 98. Each pixel in the object being drawn can be represented by an address which includes an x integer component ($x_i$) and a y fractional component ($y_f$). The value of $x_i$ indicates the position of the pixel and $y_f$ indicates the type of bitting that is being performed. For the quarter bitting case $x_i$ can be represented by two low order bits, designated as $x_{lo}$, and $y_f$ can be expressed by use of two bits. For the implementation 98, a one is produced at its output when none of the following is true:

$(y_f=1)(x_{lo}=0)$
$(y_f=2)(even(x_{lo}))$
$(y_f=3)(x_{lo}\neq 3)$

The implementation 98 can be used to turn on bits along an edge as follows:

if the y coordinate has 0 fractional part, all values of x will result in a 1;

if the y coordinate has ¼ fractional part, all values of x except those divisible by 4 will result in a 1;

if the y coordinate has ½ fractional part, odd values of x will result in a 1; and if the y coordinate has ¾ fractional part, only those values of x yielding a remainder 3 when divided by 4 will result in a 1.

For another opposing edge, in which an opposite scheme is desired, the above results are simply complemented. The above approach is applicable to top/bottom edges and/or left/right edges.

It will be understood by those skilled in the art that while the implementation 98 is designed for quarter bitting, using the concept underlying the design of implementation 98, other logical implementations can be obtained. That is, in view of the flow diagram 62, simple hardware components, such as and/nand gates, or/nor gates and inverters, can be suitably arranged to achieve a predicate for a desired case of nth bitting.

Figure 5A:
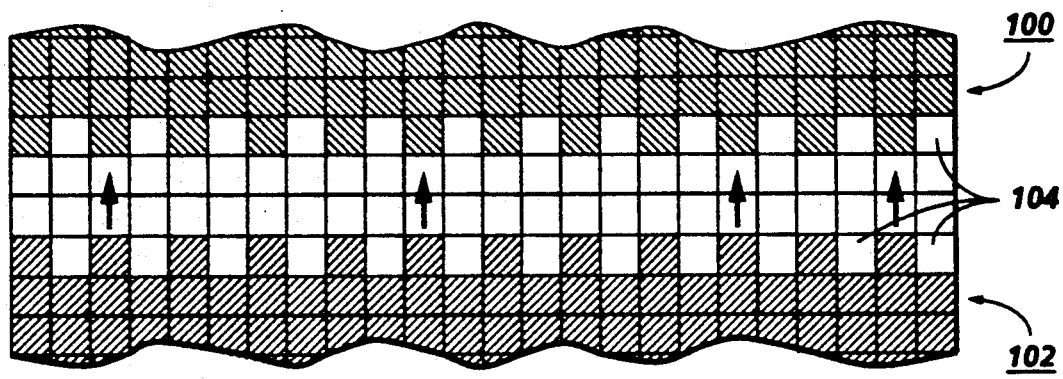
FIG. 5A is a schematic, plan, exploded view of two objects with intermeshed half bitted edges in which the turned on pixels of the edges have not been suitably offset.
Figure 5B:
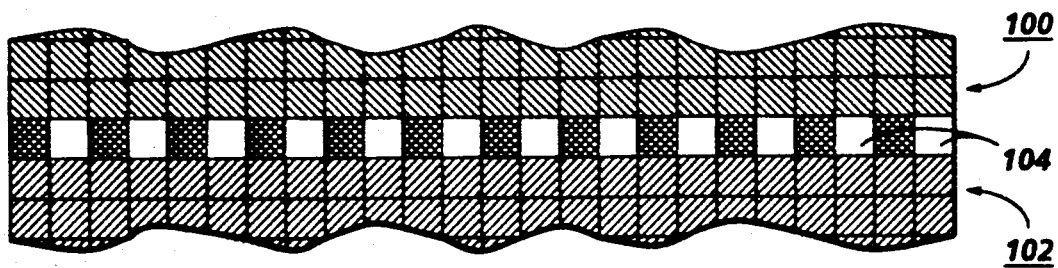
FIG. 5B is similar to FIG. 5B except that the edges are actually overlapped to demonstrate the lack of suitable offset.

In the use of graphics, it is often desirable to intermesh nth bitted edges. This allows objects to abut one another across partial pixel boundaries. Referring to FIGS. 5A and 5B, it will be understood that optimum results in intermeshing are achieved only when the intermeshing is performed in a particular manner. In particular, FIG. 5A illustrates the merging of a first (e.g. top) half bitted edge of a first colored object 100 and a second (e.g. bottom) half bitted edge of a second colored object 102 against a background 104, while FIG. 5B illustrates the resulting partial pixel boundary. Since the turned on pixels of each edge have not been offset in accordance with the present invention, undesirable overlap of the colors occurs along the partial pixel boundary formed between objects 100 and 102, and undesirable showing of the background 104 occurs through resulting holes 106.

Figure 6:
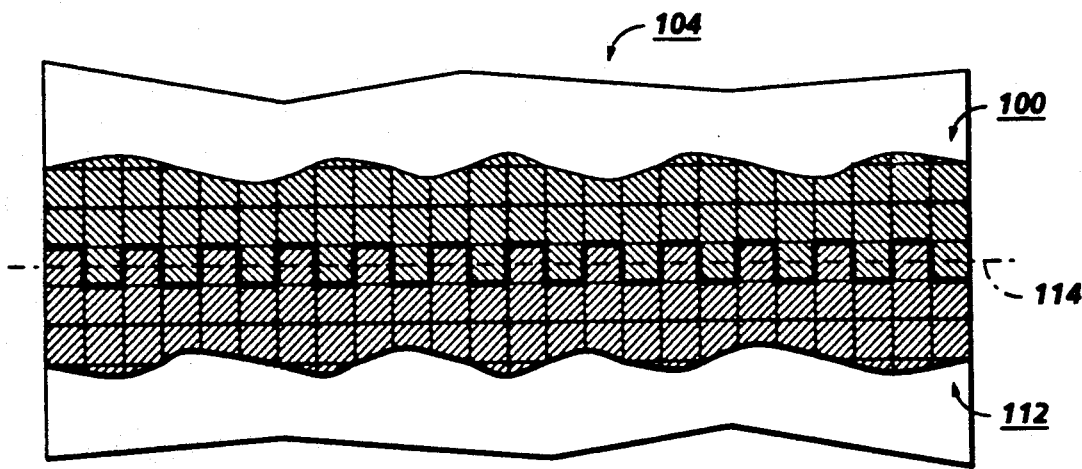
FIG. 6 is a schematic, plan view of two objects with intermeshed half bitted edges in which the turned on pixels of the edges have been suitably offset.
Figure 7:
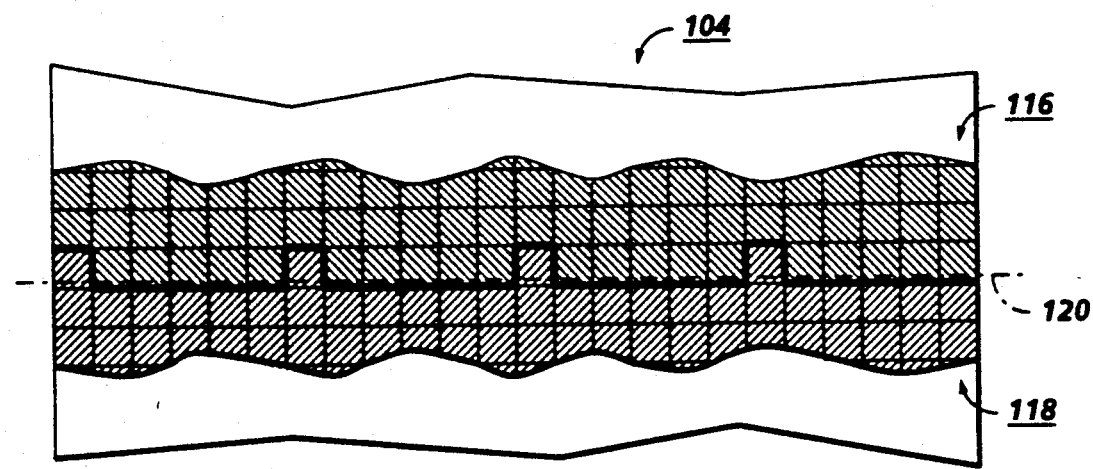
FIG. 7 is a schematic, plan view of two objects with intermeshed sixth bitted edges in which the turned on pixels of the edges have been suitably offset.

Referring to FIGS. 6-8, a preferable approach to intermeshing is discussed in further detail. In particular, the first colored object 100 is shown with its half bitted edge overlapped with the half bitted edge of a second colored object 112. Both of objects 100 and 112 are positioned on the background 104. In the illustrated embodiment of FIG. 6, the edge of object 100 is formed with the template scanline 36 (FIG. 2) and the edge of object 112 is formed with the template scanline 48. Consequently, when the edges of objects 100 and 112 are intermeshed, the objects 100,112 appear to abut one another at a line designated by the numeral 114. Since both edges are half bitted, the line 114 appears to be located one half between the objects 110,112. Additionally, no mixing appears to occur between the colors and the background 104 does not show through at the boundary.

In the illustrated embodiment of FIG. 7, a first colored object 116 is shown with its one sixth bitted edge overlapped with the five sixths bitted edge of a second colored object 118. Both of objects 116 and 118 are positioned on the background 104. In the illustrated embodiment of FIG. 7, the edge of object 116 is formed with the template scanline 38 (FIG. 2) and the edge of object 118 is formed with the template scanline 56. Consequently, when the edges of objects 116 and 118 are intermeshed, the objects 116,118 appear to abut one another at a line designated by the numeral 120. Since one edge is one-sixth bitted and the other edge is five sixths bitted, the edge of object 116 appears to be 1/6 pixel wide while the edge of object 118 appears to be 5/6 pixel wide. Additionally, no mixing appears to occur between the colors and the background 104 does not show through at the boundary. It will be understood that while the illustrated embodiments of FIGS. 6 and 7 are for the sixth bitting case, the above discussion applies with equal force to any nth bitting situation in which foreground objects are intermeshed.

While the illustrated embodiments of FIGS. 6 and 7 show colored objects abutting one another, it may be desirable to configure edges so that a gap remains along the boundary of intermeshed objects. Referring to FIG. 8, first and second nth bitted colored objects are respectively designated by the numerals 122 and 124, while a background underlying the objects is designated by the numeral 126. Since the object 122 is one quarter bitted and the object 124 is one half bitted, an apparent gap 128 can be seen when the objects 122,124 are viewed in a display as part of many other pixels. When viewed in the display, the edge of object 122 would appear to be ¼ pixel wide, the edge of object 124 would appear to be ½ pixel wide, and mixing would appear to occur in the gap 128. This mixing can serve to form a boundary between two colors, and is particularly useful in delineating adjacent objects having colors that are similar.

A slanted edge having a linearly changing slope can, in one example, be drawn with a known routine in which rectangles of varying size are placed side by side. Drawing lines in this fashion, however, can lead to the formation of "jaggies," or what is commonly referred to as aliasing. Some of the resulting aliasing can be be alleviated by a computationally demanding method in which every pixel through which an edge passes is rendered at a very high resolution. In this method, the edge is rendered at four times the resolution of the remainder of the image, and the fraction of the edge covering the pixel is computed using a 4×4 bitmap. In each bitmap 4, 8, 12 or 16 bits are turned to form the edge, and up to sixteen pixels must be turned on to increase positioning accuracy by a factor of four.

Figure 10A:
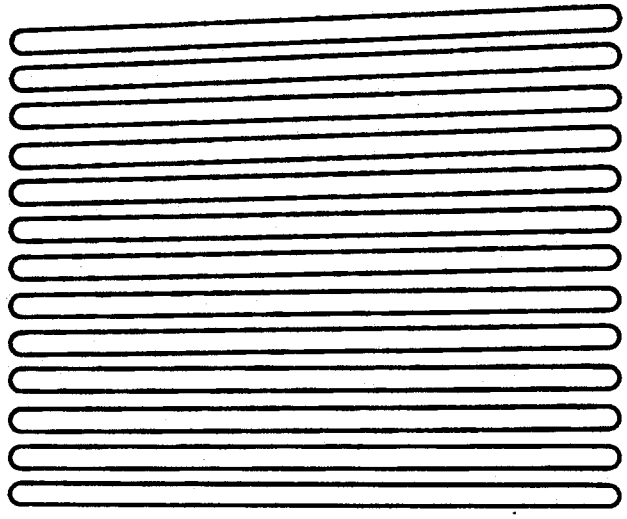
FIG. 10A is a schematic view of lines drawn in accordance with a common prior art technique.

In the prior art, to smooth an edge that slants relative to horizontal or vertical, spans of pixels, having one of the above-mentioned bit values are turned on, and the transition between a span with one bit value and a span with another bit value is made by inserting a pixel with an intermediate bit value. For example, referring to FIG. 9A, an intermediate valued pixel 132 with six subpixels turned on is positioned between pixel 134 with four subpixels turned on and pixel 136 with 8 subpixels turned on. Commonly, prior art approaches have used, at most, one single intermediate valued pixel to make the transition between spans of pixels. Referring to FIG. 10A, lines drawn with the common prior art approach, are shown. As can be recognized, the common prior art approach fails to prevent jaggies substantially.

Figure 10B:
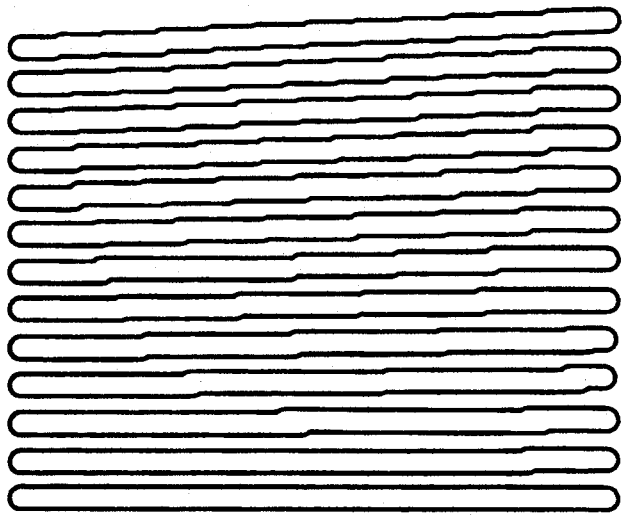
FIG. 10B is a schematic, plan view of lines drawn in accordance with the inventive method.

While the Schilling reference discussed in the Background above discloses an approach for developing more than one intermediate valued pixel, Schilling's approach is relatively complex to implement. Referring to FIG. 9B, an approach of the present invention, that can be implemented easily with the above-discussed nth bitting technique, is explained in further detail. In the illustrated approach of FIG. 9B, three distinct intermediate valued pixels 138, 140 and 142 are inserted between pixels 134 and 136. Each of pixels 138, 140 and 142 are developed by turning on the bottom four subpixels and then quarterbitting the resulting edge formed by the four subpixels. The quarterbitting for each pixel can be performed automatically by appropriately applying a portion of a template scanline stored in a memory. For example, the quarterbitting can be performed with the implementation shown in FIGS. 3 and 4, and discussed in the accompanying text. As will be appreciated by those skilled in the art, bitmaps having dimensions greater than 4×4 could be used to form the slanted edge, and in such case suitable nth bitting would be used to enhance the edge. Referring to FIG. 10B, lines drawn with the approach of the present invention, are shown. As can be recognized, the approach of the present invention is effective in minimizing jaggies.

Various features of the present invention will be apparent to those skilled in the art. First, partial bit boundaries can be readily formed by use of predeveloped template scanlines stored in memory. Second, through the use of nth bitted edges, a partial pixel boundary can be formed between two color objects without generating unwanted color mixing or gaps. Alternatively, color mixing can be performed in a gap to afford a visible boundary between two objects of similar color. Finally, nth bitted patterns can be used to form a smooth slanted edge for avoiding common aliasing problems.

What is claimed is:

1. A method for constructing a first group of edge patterns for use on a first edge in an image and a second group of edge patterns for use on a second edge in the image, each edge pattern being divided into at least two equal portions of pixels with n pixels in each portion, each of the pixels possessing a selected one of at least a first output state and a second output state, said method comprising the steps of:

providing first and second edge patterns to the first group of edge patterns and third and fourth edge patterns to the second group of edge patterns, the first, second, third and fourth edge patterns being characterized by a first slope, second slope, third slope and fourth slope, respectively, with each of the first slope, second slope, third slope and fourth slope assuming the same value;

setting a first selected number of pixels in the first edge pattern to the second output state so that the first edge pattern is characterized by a first intensity;

setting a first selected number of pixels in the third edge pattern to the second output state so that the third edge pattern is characterized by a first intensity, the pixels with the second output state in the first edge pattern being offset relative to the pixels with the second output state in the third edge pattern;

setting a second selected number of pixels in the second edge pattern to the second output state so that the second edge pattern is characterized by a second intensity; and setting a second selected number of pixels in the fourth edge pattern to the second output state so that the fourth edge pattern is characterized by a second intensity, the second selected number of pixels being different than the first selected number of pixels and the first intensity being different from the second intensity.

2. A method for constructing a first group of edge patterns for use on a first edge in an image and a second group of edge patterns for use on a second edge in the image, each edge pattern being divided into at least two equal portions of pixels with n pixels in each portion, each of the pixels possessing a selected one of at least a first output state and a second output state, said method comprising the steps of:

providing first and second edge patterns to the first group of edge patterns and third and fourth edge patterns to the second group of edge patterns;

setting a first selected number of pixels in the first edge pattern to the second output state;

setting a first selected number of pixels in the third edge pattern to the second output state, the pixels with the second output state in the first edge pattern being offset relative to the pixels with the second output state in the third edge pattern;

setting a second selected number of pixels in the second edge pattern to the second output state;

setting a second selected number of pixels in the fourth edge pattern to the second output state, the second selected number of pixels being different than the first selected number of pixels; and wherein each of said setting steps includes setting the pixels in a manner which causes the second output state to occur periodically along each edge.

3. The method of claim 2, wherein, for the step of setting a first selected number of pixels in the first edge pattern, c out of every n pixels possesses the second output state, and for the step of setting a second selected number of pixels in the fourth edge pattern, (n-c) out of every n pixels possesses the second output state.

4. The method of claim 2, wherein for the step of setting a second selected number of pixels in the second edge pattern, c out of every n pixels possesses the second output state, and for the step of setting a first selected number of pixels in the third edge pattern, (n-c) out of every n pixels possesses the second output state.

5. The method of claim 2, further comprising the step of using at least one selected portion of the edge patterns to configure an edge of an object for preventing aliasing.

6. The method of claim 2, wherein, for one of the setting steps, only the first pixel in each edge pattern portion is set to the second output state.

7. The method of claim 6, wherein for each edge pattern, each portion possesses at least four pixels, and for another one of the setting steps, the last three consecutive pixels in each portion of the edge pattern are set to the second output state.

8. The method of claim 2, wherein:
each edge pattern comprises odd pixels and even pixels;
for one of the steps of setting a first selected number of pixels in the first edge pattern and setting a second selected number of pixels in the second edge pattern, two of the odd pixels in each portion is set to the second output state; and
for one of the steps of setting a first selected number of pixels in the third edge pattern and setting a second selected number of pixels in the fourth edge pattern, two of the even pixels in each portion to set to the second output state.

9. The method of claim 2, wherein n=4.

10. The method of claim 2, wherein n=8.

11. The method of claim 2, wherein n=6.

12. The method of claim 11, wherein each edge pattern comprises odd pixels and even pixels, and for one of the setting steps, only one of the pixels disposed between the first odd pixel of each portion is set to the second output state.

13. A method for at least partially superposing an edge of a first object with the edge of a second object in a system for displaying at least the first and second objects against a background with the objects and the background being defined by a plurality of pixels, each pixel possessing a selected one of at least a first output state and a second output state, comprising the steps of:
setting a first set of pixels disposed along the edge of the first object to the second output state; at least some of the pixels in the first set being spaced with respect to one another;
setting a second set of pixels disposed along the edge of the second graphic object to the second output state, and at least some of the pixels in the second set being spaced with respect to one another; and
superposing the edge of the first object with the edge of the second object so that the first set of pixels is intermeshed with the second set of pixels to form a partial pixel boundary between the first object and the second boundary.

14. The method of claim 13, wherein:
each edge is divided into portions of n pixels;
for the step of setting a first set of pixels, c pixels out of every n pixels are set to the second output state; and
for the step of setting a second set of pixels, (n-c) pixels out of every n pixels are set to the second output state.

15. The method of claim 13, wherein:
each edge is divided into portions of n pixels; and
for at least one of the setting steps, c pixels out of every n pixels are set to the second output state; and
$c < (n/2)$.

16. The method of claim 13, wherein:
each edge is divided into portions of n pixels;
for the step of setting a first set of pixels, j pixels out of every n pixels are set to the second output state;
for the step of setting a second set of pixels, k pixels out of every n pixels are set to the second output state; and
$(j+k) < n$.

17. The method of claim 16, wherein, for the step of superposing the edge of the first object with the edge of the second object:
the first object comprises a first color and the second object comprises a second color; and
a gap is formed between the first and second objects when their respective edges are at least partially superposed; and
the colors appear to be mixed in the gap when the superposed edges are viewed on a display.

18. A method for reducing aliasing along an edge of an object, the edge including first, second and third pixels being positioned substantially adjacent one another along a common axis, said method comprising the steps of:
dividing each of the first, second and third pixels into respective first, second and third grids, each of the grids comprising a matrix of n×n subpixels, each subpixel possessing a selected one of at least a first output state and a second output state;
providing an edge pattern of n subpixels, c of the n subpixels in the edge pattern being set to the second output state;
setting d subpixels in the first and second grids to the second output state so that respective edges are formed by the d subpixels in the first and second grids;
setting e subpixels in the third grid to the second output state; and
using the edge pattern for setting c subpixels along the edge in the second grid to the second output state so that the second pixel serves as a transitional pixel between the first pixel and the third pixel to facilitate antialiasing.

19. The method of claim 18, wherein n=4.

20. The method of claim 19, wherein c=2 and for the step of providing an edge pattern, only every other subpixel in the template scanline is set to the second output state.

21. The method of claim 18, further comprising the steps of:
interposing a fourth pixel between the second and third pixels;
dividing the fourth pixel into a fourth grid, the fourth grid comprising a matrix of n×n subpixels, each subpixel possessing a selected one of at least a first output state and a second output state;
providing a second edge pattern of n subpixels, f of the n subpixels in the second edge pattern being set to the second output state;
setting d subpixels in the fourth grid to the second output state so that an edge is formed in the fourth grid by the d subpixels; and
using the second edge pattern for setting f subpixels along the edge in the fourth grid to the second output state so that the fourth pixel serves as a second transitional pixel between the first pixel and the third pixel.

* * * * *